United States Patent [19]

Abrams

[11] Patent Number: 4,849,111
[45] Date of Patent: Jul. 18, 1989

[54] REGENERATING DYNAMIC ADSORBER SYSTEM AND METHOD FOR OBTAINING CLEANED FLUID FROM CONTAMINATED FLUID

[75] Inventor: Richard F. Abrams, 9 Jasper St., Westboro, Mass. 01581

[73] Assignee: Richard F. Abrams, Westboro, Mass.

[21] Appl. No.: 186,156

[22] Filed: Apr. 26, 1988

Related U.S. Application Data

[63] Continuation-in-part of Ser. No. 12,300, Feb. 9, 1987, Pat. No. 4,764,187.

[51] Int. Cl.⁴ ................... B01D 15/00; B01D 29/38
[52] U.S. Cl. ................... 210/673; 210/678; 210/682; 210/138; 210/274; 210/287; 210/902
[58] Field of Search ......... 55/59, 62, 66, 74, 161–163, 55/179, 387; 210/673, 678, 682, 138, 139, 264, 269, 274, 287, 289

[56] References Cited

U.S. PATENT DOCUMENTS

| | | | |
|---|---|---|---|
| 1,276,629 | 8/1918 | Duggan | 210/678 |
| 1,986,814 | 1/1935 | Hartman | 55/162 |
| 2,227,520 | 1/1941 | Tiger | 210/673 |
| 3,053,268 | 9/1962 | Schulze et al. | 210/138 X |
| 3,596,438 | 8/1971 | Beukenkamp et al. | 55/59 |
| 3,631,983 | 1/1972 | Mail | 210/274 X |
| 3,698,554 | 10/1972 | Mail | 210/274 X |
| 3,831,755 | 8/1974 | Goodman et al. | 210/274 X |
| 3,890,121 | 6/1975 | Thomas | 55/66 X |
| 4,414,003 | 11/1983 | Blaudszun | 55/59 X |
| 4,421,532 | 12/1983 | Sacchetti et al. | 55/59 X |
| 4,687,573 | 8/1987 | Miller et al. | 210/269 X |
| 4,756,724 | 7/1988 | Yuill | 55/66 X |
| 4,764,187 | 8/1988 | Abrams | 55/77 X |
| 4,764,281 | 8/1988 | Elfline | 210/682 X |

OTHER PUBLICATIONS

J. D. Lowry et al., "Point-Of-Entry Removal of Radon from Drinking Water", Journal AWWA, Apr. 1987, pp. 162-169.

J. D. Lowry et al., "Modeling Point-Of-Entry Radon Removal by GAC", Journal AWWA, Oct. 1987, pp. 85-88.

EPA, "Removal of Radon From Household Water", Sep. 1987, Report No., OPA-87-011.

Sherman Hasbrouck, "Removal Radon From Water Using Granular Activated Carbon Adsorption", The Land & Water Resources Center, U. of Maine at Orono, Jun. 1986, Information Digest.

*Primary Examiner*—Robert Spitzer
*Attorney, Agent, or Firm*—Joseph S. Iandiorio; Brian M. Dingman

[57] ABSTRACT

A method and apparatus for a regenerating dynamic adsorber system which removes a contaminant from fluid. The system includes at least one adsorption bed having a contaminant removal capacity that is based substantially on the flow of the contaminated fluid through the bed. The system alternately cleanses the contaminated fluid by feeding the contaminated fluid from a first volume to the bed and issuing cleansed fluid to a second volume, and regenerates the bed by providing clean fluid from a third volume and issuing the fluid back to the third volume.

26 Claims, 6 Drawing Sheets

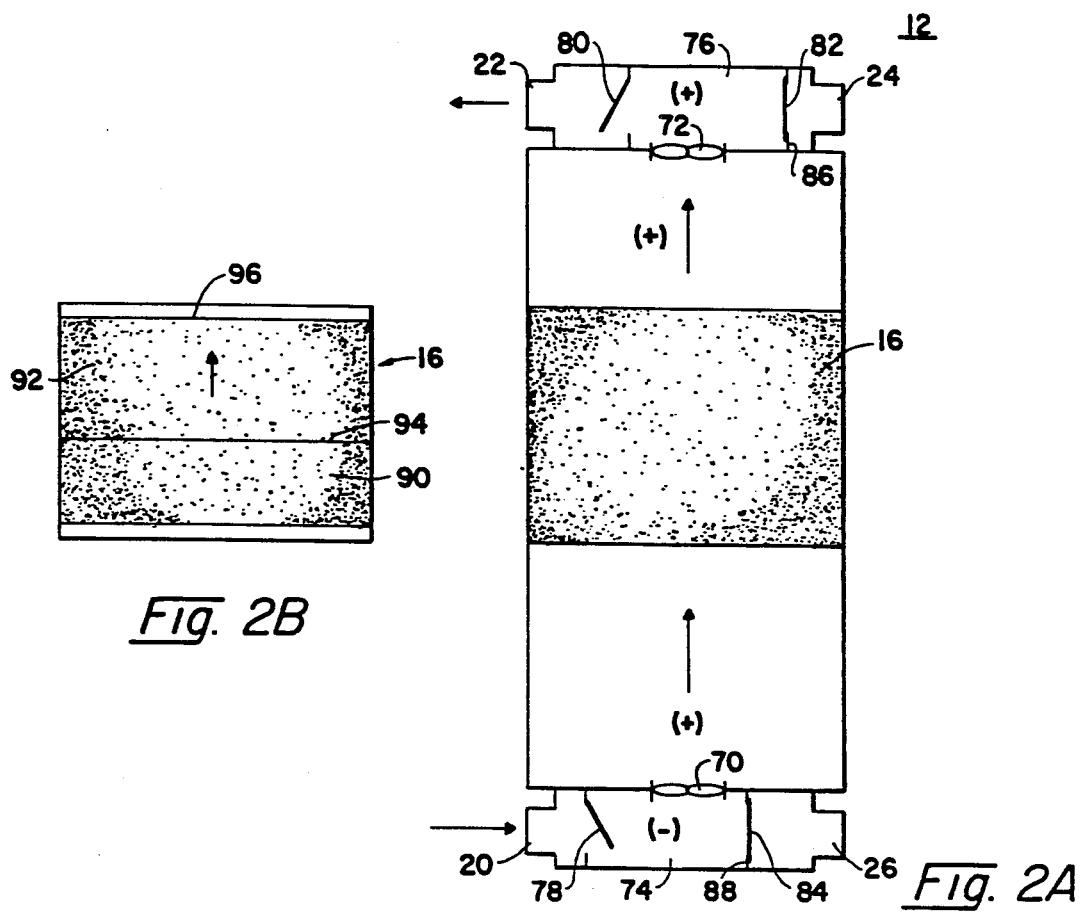
Fig. 2B
Fig. 2A
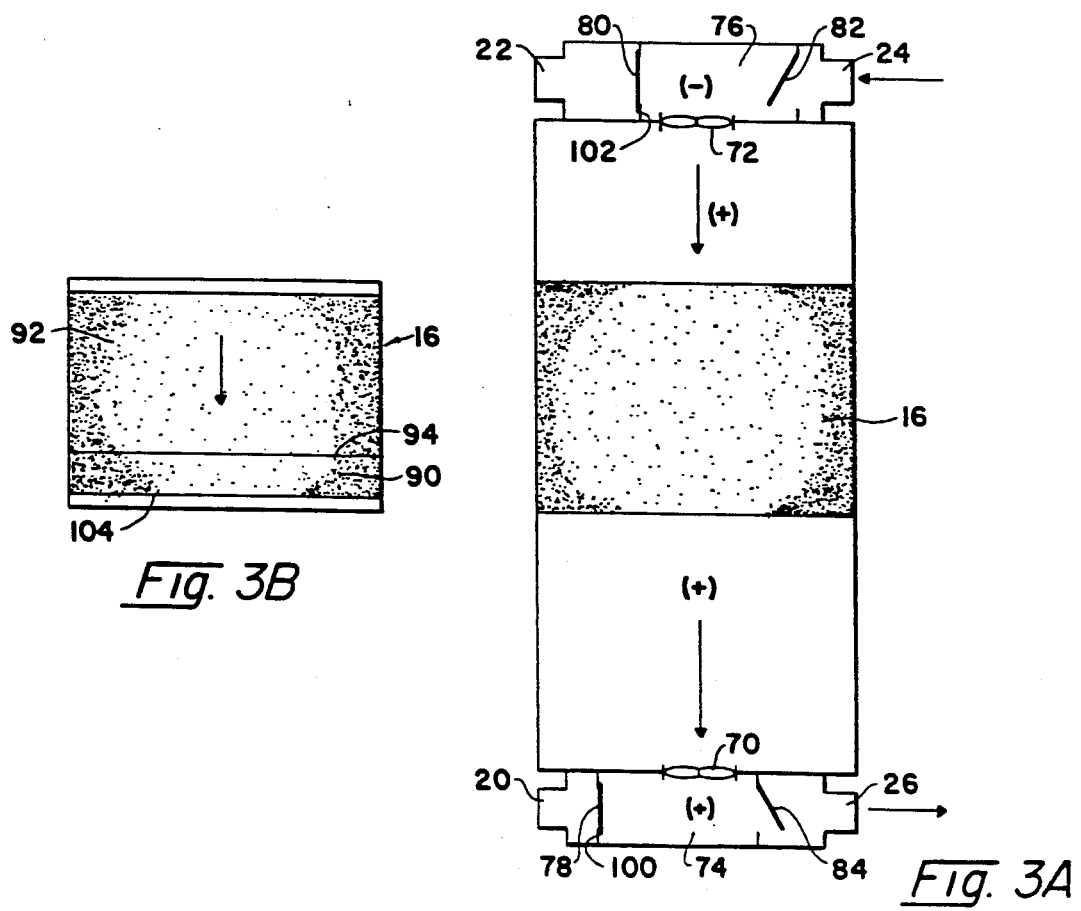
Fig. 3B
Fig. 3A

REGENERATING DYNAMIC ADSORBER SYSTEM AND METHOD FOR OBTAINING CLEANED FLUID FROM CONTAMINATED FLUID

RELATED APPLICATION

This application is a continuation-in-part of the patent application entitled "Regeneration Dynamic Adsorber System and Method for Contamination Removal", filed Feb. 9, 1987, Ser. No. 07/012,300, now U.S. Pat. No. 4,764,187, issued Aug. 16, 1988.

FIELD OF INVENTION

This invention relates to a dynamic adsorber for removing radon and other contaminants from a fluid to obtain cleansed fluid, and more particularly to such a dynamic adsorber for cleansing water using one or more adsorption beds which are periodically flushed with clean air to regenerate the adsorption beds.

BACKGROUND OF INVENTION

There are a number of applications in which it is desirable to remove hazardous contaminants such as radon from a fluid such as air or water. Radon accumulation in homes, schools, and other buildings is recognized as a serious health problem. Radon is a radioactive noble gas produced in the ground by the natural decay of uranium and radium. The radon further decays to a chain of daughter products which associate with dust particles in the air. The daughter products emit harmful alpha radiation which, when inhaled, damages lung tissue. Tens of thousands of cases of lung cancer are estimated to arise each year from radon infiltration into homes.

While the majority of the source of radon in the air of buildings is due to soil gas, the potential also exists for radon to be released from well water that has radon dissolved in it. Many thousands of private wells and additional municipal and Federal water supplies may be affected. This waterborne radon is not a hazard when it is dissolved in the water, but it can become airborne when the water is used. A shower, faucet, or toilet can release the radon into the indoor air and can cause localized high concentrations of the gas. This radon gas then diffuses through the rest of the building and can cause an overall high level of radon.

For every 10,000 pCi/L of radon in household water, there will be an increase of about 1 pCi/L in the air inside a home. Levels of about 4 pCi/L in the air or a waterborne level of 40,000 pCi/L are above recommended levels set by the Environmental Protection Agency.

A fiberglass tank containing a bed of granular activated carbon (GAC) has been proven to be effective in removal of low concentrations of impurities in water. The GAC tank contains approximately 2.5 cubic feet of charcoal and is typically installed in the main water supply line after the pressure tank. The high removal efficiency is achieved by allowing the radon gas to decay in the charcoal bed, thus eliminating it as a source. The deca of radon in the beds, however, leads to the build-up of daughter products on the carbon. In particular, Pb-214 and Bi-214 accumulate, and when they decay, they give off gamma radiation. Prior research has shown that roughly one mRem per hour of gamma activity is given off for every 17,800 pCi/L. In some cases, gamma exposure rates of up to 72 mRem per hour have been documented. The potential for these high external radiation fields and the additional concern for lead build-up on the carbon, as well as concerns for disposing of the contaminated beds, discourages using a GAC tank.

Another filter system uses aeration to remove the radon from the water before it is used. However, aeration is performed at atmospheric pressure and therefore requires depressurization and then repressurization of the water supply. Aeration equipment is also relatively costly, occupies a considerable amount of space, and has numerous pieces of operating equipment which may require significant maintenance cost.

SUMMARY OF INVENTION

It is therefore an object of this invention to provide an improved system and method for removing contaminants from a liquid using regenerable adsorption beds.

It is a further object of this invention to provide such a system and method for removing contaminants from a liquid without recontaminating the cleansed liquid with the contaminated fluid.

It is a further object of this invention to provide such a system and method which regenerate the adsorption beds efficiently, inexpensively, and reliably.

It is a further object of this invention to provide an improved system and method for removing contaminants from liquid using a bed of activated charcoal.

Yet another object of this invention is to provide such a system and method for removing radon from a water supply using outdoor air to regenerate the activated charcoal.

A still further object of this invention is to provide such a system which minimizes build-up of daughter products of radon that may build up on the adsorption beds by removing radon before it decays significantly.

This invention results from the realization that truly effective removal of radon from water and of other contaminants from water, at a concentration sufficiently low so that the dynamic adsorption capacity of an adsorption bed is dependent primarily on the flow of water supplied to a home, can be achieved by feeding the contaminated water to the bed and then cleansing the bed utilizing essentially contaminant-free outdoor air at a flow which, based on the relative temperatures of the water and the outdoor air, is sufficient to regenerate contaminated beds, and by releasing the contaminated regeneration air to the outdoors.

This invention features a dynamic adsorber system for removing a contaminant from fluid. The system includes an adsorption bed having a contaminant removal capacity that is based substantially on the flow of the contaminated fluid through the bed, means for feeding contaminated fluid to be cleansed from a first volume to the adsorption bed for issuing cleansed fluid to a second volume, means for providing clean fluid, relatively free of contaminant, from a third volume to the bed to flush it with the clean fluid and for issuing the fluid back to the third volume, and control means for alternating the means for feeding and the means for providing to cleanse the contaminated fluid and to regenerate the adsorption bed.

The clean fluid is provided at a greater flow rate to the bed by the means for providing than that of the contaminated fluid, at least when the temperature of the clean fluid is lower than that of the contaminated fluid. The contaminated liquid may consist of water obtained from a water supply and the clean fluid may include outdoor air which is returned outdoors after regeneration of the bed. The control means may include timer means for establishing successive time periods that determine when the bed is to be alternately connected to either the means for feeding or the means for providing to accomplish cleansing with or regeneration of the bed. Means for feeding may include fan means for driving clean air through the adsorption bed, which may consist of activated charcoal.

In another embodiment a dynamic adsorber system for removing a contaminant from fluid includes a first and second adsorption bed, means for feeding contaminated fluid to be cleansed from a first volume to one of the beds and for issuing cleansed fluid to a second volume, means for providing clean fluid, relatively free of the contaminant, from a third volume to the other bed to flush it with the clean fluid and for issuing the fluid back to the third volume, and control means for connecting the means for feeding alternately to the first and second beds to remove the contaminant from the fluid and for connecting the means for providing to the bed not connected to the means for feeding to regenerate that bed before it is reconnected to the means for feeding. Each bed has a contaminant removal capacity that is based substantially on the flow of the contaminated fluid through each bed for removing the contaminant. The flow of clean fluid supplied to a bed is greater than that of the flow of contaminated fluid supplied to that bed at least when the temperature of the clean fluid is lower than that of the contaminated fluid. The system may be used for cleaning water from a contaminated water supply and regenerated by outdoor air.

In another embodiment, a dynamic adsorber system for removing a contaminant from water consists of first and second adsorption beds, each having a capacity for removing the contaminant that is based substantially on the flow of the contaminated water through to the bed, means for feeding the contaminated water from a water supply to be cleansed to one of the beds and for issuing cleansed water to a water dispenser, means for providing outdoor air relatively free of the contaminant to the other bed to remove the contaminant outdoors, in which the means for providing supplies outdoor air at a greater flow than that of contaminated water, at least when the temperature of the air is lower than that of the contaminated water, and control means for connecting the means for feeding alternately to first and second beds to remove the contaminant from the water and for connecting the means for providing to the bed not connected to the means for feeding to regenerate that bed before it is reconnected to the means for feeding.

A further embodiment includes a method of dynamic adsorption for removing a contaminant from a fluid. The method consists of feeding contaminated fluid to be cleansed from a first volume to an adsorption bed having a contaminant removal capacity that is based substantially on the flow of the contaminated fluid through the bed, issuing cleansed fluid from the bed to a second volume, and sequentially regenerating that bed by providing clean fluid, relatively free of the contaminant, from a third volume to the bed to flush it with the clean fluid and returning that fluid to the third volume. The method may further include the step of regenerating a second adsorption bed while feeding contaminated fluid to the other bed, and subsequently feeding the second bed with contaminated fluid while regenerating the other bed to provide continuous cleaning of fluid. The contaminated fluid may be contaminated water, and the clean fluid may be outdoor air.

DISCLOSURE OF PREFERRED EMBODIMENT

Other objects, features, and advantages will occur from the following description of a preferred embodiment and the accompanying drawings, in which:

FIG. 2A is a schematic cross-sectional view of one of the cannisters during the cleansing mode;

FIG. 2B is a schematic diagram showing the saturation of the charcoal bed of the cannister in FIG. 2A after one-half of a cycle;

FIG. 3A is a cross-sectional view of the cannister of FIG. 2A during regeneration mode;

FIG. 3B is a schematic diagram of the charcoal bed of the cannister of FIG. 2A halfway through the cycle;

This invention may be accomplished by feeding a contaminated fluid such as water from a private well to an adsorption bed for cleansing. The adsorption bed is thereafter regenerated by stopping the flow of water to the bed and providing a clean fluid such as outdoor air to the bed at a flow rate which, based on the relative temperatures of the bed and the outdoor air, is sufficient to drain, dry, and then purge the bed of contaminants. The regeneration air and fluid is deposited outdoors during regeneration.

In one construction, contaminated water is fed to a tank having a single bed which alternately cleanses the water and then is regenerated with clean outdoor air. In another construction, contaminated water is continuously cleansed by a tank that is divided into two beds which alternately cleanse water and are regenerated. Both of these constructions are discussed in relation to FIGS. 6 and 7.

Figure 1:
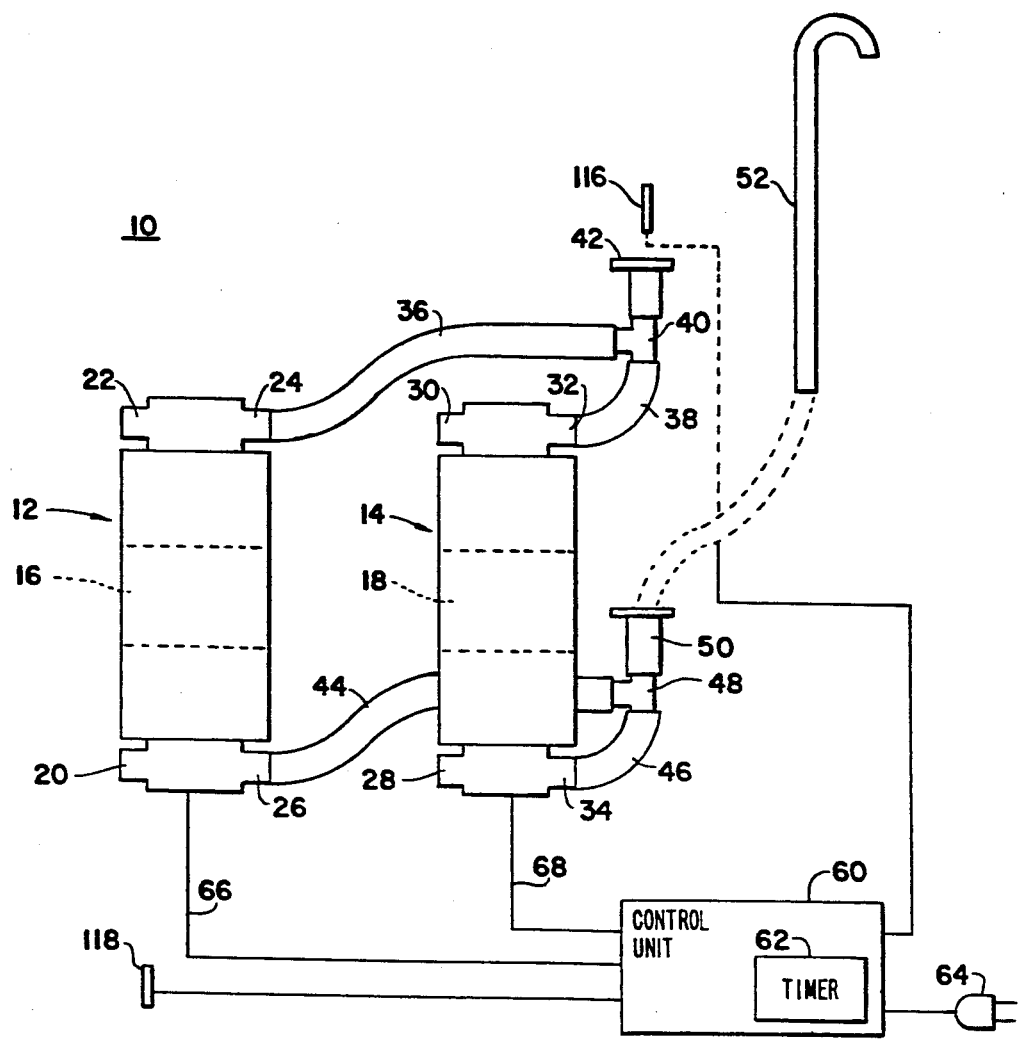
FIG. 1 is a schematic diagram of a novel regenerating dynamic adsorber system utilizing dual charcoal cannisters.

Dynamic adsorber system 10, FIG. 1, is suitable for use in a home or other building and includes cannisters 12, 14, each containing adsorption beds 16, 18, respectively. Cannister 12 has feed inlet 20 and feed outlet 22 for obtaining contaminated air to be cleansed and returning cleansed air during a cleansing mode. Cannister 12 also contains regenerating inlet 24 and regenerating outlet 26 through which clean, outdoor air relatively free of radon enters cannister 12 during a regeneration mode to flush bed 16 with the clean air and issue contaminated air, which is returned outdoors. Similarly, cannister 14 carries feed inlet 28, feed outlet 30, regenerating inlet 32, and regenerating outlet 34. Ducts 36, 38 are connected by T-coupler 40 to duct 42 which passes through the wall of the building to obtain outdoor air. Conventional 4-inch diameter dryer hose is acceptable for ducts 36, 38, 42. Exhaust ducts 44, 46 are connected through T-coupler 48 to duct 50 which carries contaminated air used for regeneration to exhaust pipe 52, e.g., a snorkle projecting 8 to 10 feet above the ground outdoors.

The operation of cannisters 12, 14 is controlled by control unit 60 having timer 62. Power is obtained through plug 64 and is passed through lines 66, 68 to fans within cannisters 12, 14 to alternately establish regeneration and cleansing modes for each cannister.

Cannister 12 is shown in cross-section, FIG. 2A, to reveal feed fan 70 and regenerating fan 72 associated with plenums 74, 76, respectively. During the cleansing mode, a negative pressure differential is established in plenum 74 and a positive pressure differential is established in plenum 76 to open passive feed flapper valves 78, 80 while closing regenerating flapper valves 82, 84 by forcing valve 82 against stop 86 and drawing flap 84 against stop 88. In other constructions the control valves are arranged to permit forward-flushing during regeneration instead of back-flushing.

An acceptable dimension of cannister 12 for home use is 32 inches in height while charcoal bed 16 has a depth of 4-6 inches and a surface area of 6-8 square feet. An acceptable cycle time is 30 minutes. Charcoal bed 16 is shown in FIG. 2B after 15 minutes in the cleansing mode, having saturated charcoal 90 separated from unsaturated charcoal 92 by mass transfer zone 94. At the end of 30 minutes, mass transfer zone 94 approaches upper boundary 96.

The cycle time is selected to prevent breakthrough of mass transfer zone 94 past upper boundary 96. The breakthrough time depends on the rate of airflow, velocity of air through bed 16, type of charcoal, relative humidity, the volume of bed 16, and the temperature of the airflow and bed 16.

The flow rate of the regenerating air is typically selected as follows. The maximum expected temperature of the indoor air is selected, e.g. 70° F., and a time period is determined by estimating the progression rate of the mass transfer zone for the bed in the cleansing mode. Once this time period is established, a flow rate for the regeneration air is selected which will cleanse the bed in the regenerating mode before the mass transfer zone reaches the end of the bed in the cleansing mode, that is, before that bed becomes completely saturated. The flow rate of the regenerating air is selected based on the expected low temperature of the outdoor air.

At the end of the cleansing cycle the regenerating mode is initiated. As shown in FIG. 3A, fan 70 is switched off and fan 72 is switched on to develop a negative pressure in plenum 76 and a positive pressure in plenum 74. Feed valve 78 is forced against stop 100 while feed valve 80 is drawn against stop 102. Simultaneously, regenerating valve 82 is drawn open and valve 84 is forced open to draw clean air through inlet 24 and pass contaminated regenerating air through outlet 26. Fan 72 typically has a higher capacity than fan 70 and typically drives air at a higher flow through bed 16. Alternatively, a single reversing fan having two different rotational speeds replaces fans 70, 72. As shown in FIG. 3B, after one-half of a cycle, e.g., 15 minutes, more than half of charcoal bed 16 is unsaturated charcoal 92. Mass transfer zone 94 meets lower threshold 104 in 20 to 25 minutes, well before bed 18 of cannister 14 becomes saturated.

Figure 4:
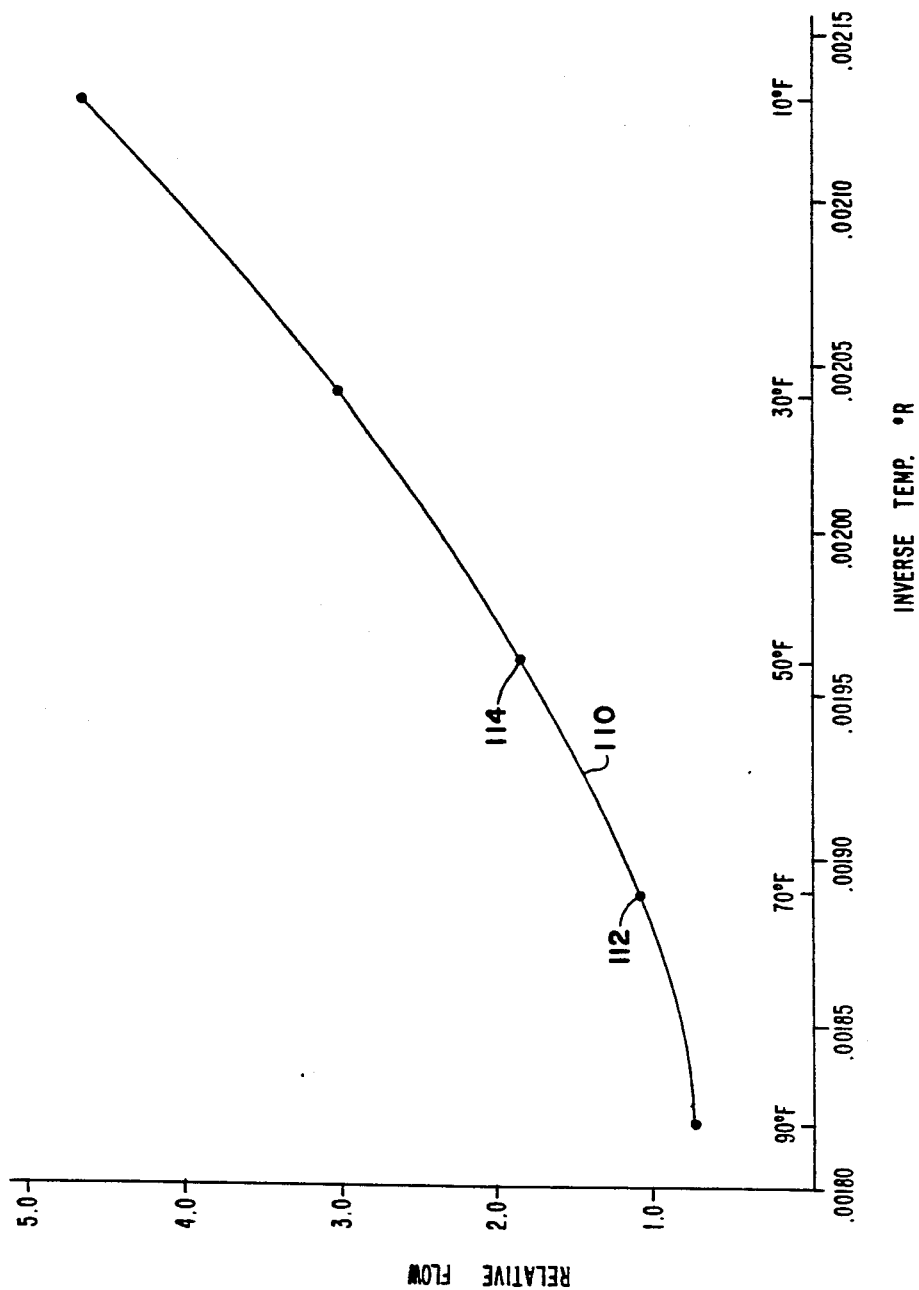
FIG. 4 is a chart showing the relationship of regeneration flow to temperature.

The relationship between the regeneration flow and temperature is shown in FIG. 4 by curve 110. The relative flow is the regeneration flow rate required relative to the flow rate of contaminated air to be cleansed at 70° F. A relative flow of 1.0, shown by point 112, corresponds to a temperature of the regenerating gas stream at approximately 70° F., while twice the flow, represented by point 114, is required to regenerate a charcoal bed in this same period of time when the regenerating gas stream is at 45° F. The 70° F. temperature is a typical maximum operating temperature of the airflow to be cleansed when the beds are located in a basement.

The capacity of the regenerating feed fans is set at a capacity suited to handle most of the lowest temperatures. Actual outdoor temperatures may drop briefly below the minimum selected temperature, but during 95-98% of the year the selected temperature is exceeded. In Massachusetts, for example, the outdoor temperature is at or above 11° F. for 98% of the year. Further, during the winter the basement temperatures are lower, e.g., 50° F., so the mass transfer zone progresses at a slower rate during cleansing of the indoor air. For example, feed fan 70 has a capacity of 200 cubic feet per minute, while regenerating fan 72 has a capacity of 600 cubic feet per minute for a 2,000 square foot house. Alternately, a temperature sensor 116, FIG. 1, can be placed outdoors to vary the speed of the regenerating fans according to the temperature of the outdoor air. When the outdoor air is warmer than the indoor air, which is measured by temperature sensor 118, the flow rate of regenerating air can be lower than the flow rate of contaminated air.

Figure 5A:
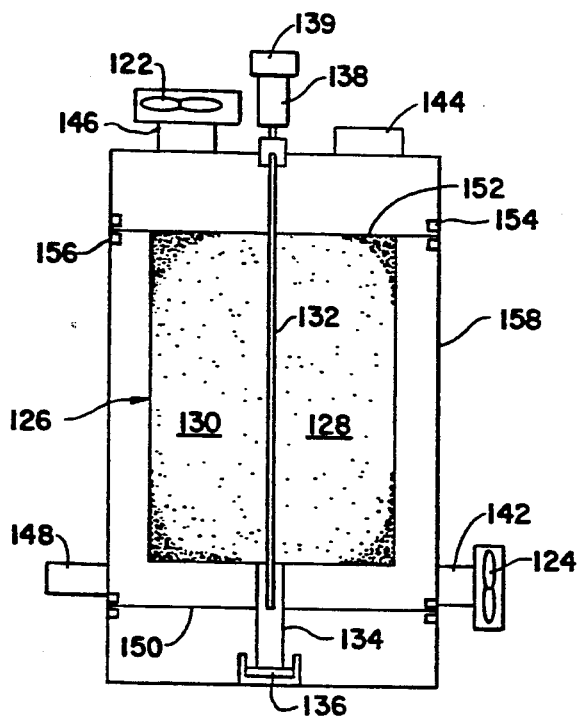
FIG. 5A is a schematic cross-sectional view of an alternative dynamic adsorber system.
Figure 5B:
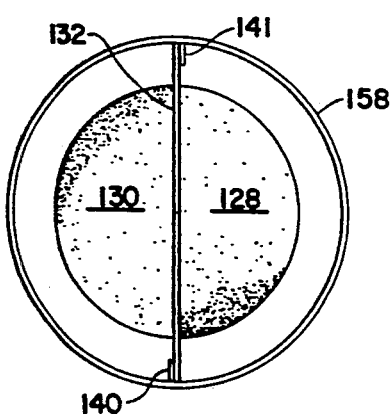
FIG. 5B is a schematic top view of the cannister of FIG. 5A.

In another construction, a single feed fan and a single regenerating fan are utilized. Dynamic adsorber system 120, FIG. 5A, is shown in cross-section having regenerating fan 122 and feed fan 124. Single cylindrical structure 126 is divided into two beds 128, 130 separated by partition 132. Structure 126 is supported by shaft 134 which turns on bearing 136 and is driven by reversing drive motor 138 as controlled by timer 139. As shown in FIG. 5B, during one cycle partition 132 is forced against one side of flanges 141, 140, while during the next cycle the bed is rotated 180° to force partition 132 against the opposite side of flanges 141, 140. Indoor air is driven at a first rate past fan 124, FIG. 5A, through inlet 142, through the bed on that side of system 120, and as cleansed air exits through outlet 144. Similarly, outdoor air is driven past regenerating fan 122 at a second rate of flow through inlet 146 and out through outlet 148. The term driving includes both pushing and drawing the air. The integrity of the feed and regenerating chambers is completed by bottom plate 150 and by sealing plate 152, which seals between the outer edge of bed 126 and housing 158 and turns through plate seals 154, 156. In another construction the beds can be translatable between feed and regenerating chambers.

In the above disclosure the dynamic adsorber cleanses contaminated fluid of a contaminated environment and returns the cleansed fluid to the contaminated environment. According to the present invention, fluid from a contaminated source, a first volume, is cleansed by a dynamic adsorber system and is then fed to a non-contaminated environment, a second volume.

Figure 6:
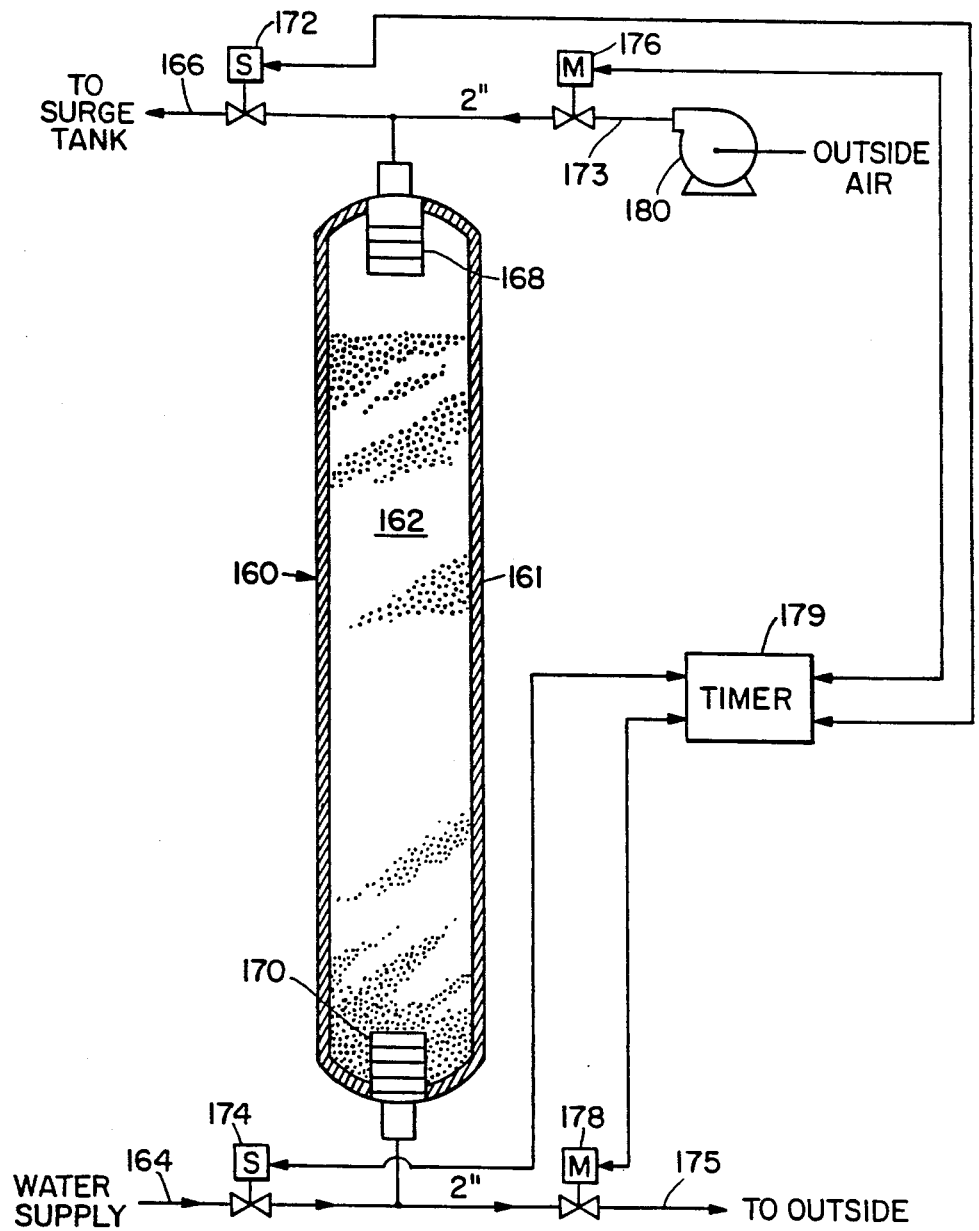
FIG. 6 is a schematic cross-sectional view of a dynamic adsorber system, according to this invention, for removing radon from water.

In one embodiment contaminants are removed by liquid such as water from a private well by a single bed adsorber system 160 as shown in FIG. 6. Adsorber system 160 includes a tank 161 containing a bed 162 of activated charcoal. In a preferred embodiment, the tank is 6 to 8 inches in diameter and contains approximately 1 cubic foot of charcoal. Contaminated water enters bed 162 for cleansing through a water supply pipe 164 and exits through a main water pipe 166 which supplies water to the building. As water passes through bed 162 contaminants such as radon are adsorbed by the charcoal. Screens 168 and 170 at each end of bed 162 prevent charcoal from entering the pipes 164, 166.

Regeneration is controlled by a timer 179 which closes water pipes 164 and 166 using solenoid valves 172 and 174 and opens air pipes 173 and 175 using motor-actuated valves 176, 178. Outside air is then pumped by a fan 180 through air pipe 173, through bed 162 and returned outside through air pipe 175. In the preferred embodiment, fan 180 produces at least 1 inch water gauge pressure. Initially, water trapped within tank 161 is flushed through air pipe 175, and the air then dries the charcoal. Radon is then desorbed from the dried charcoal bed and exhausted outside. Regeneration is done during the middle of the night or when there is no demand for water.

The amount of air required to fully purge charcoal bed 162 is dependent on the temperature of the outside air. A greater rate of airflow will be needed to purge the charcoal bed of radon if the outside air is colder. As an example, approximately 20 cubic feet of water at 60° F. are cleansed by the adsorption bed, and at least 2,500 cubic feet of air are required to desorb the radon and regenerate the bed.

In the preferred embodiment, air pipe 175 is connected to the outside by connecting it to a drain pipe, not shown, of a septic system. Contaminated air is vented through the system's air vent, and contaminated water is deposited to the septic tank.

Figure 7:
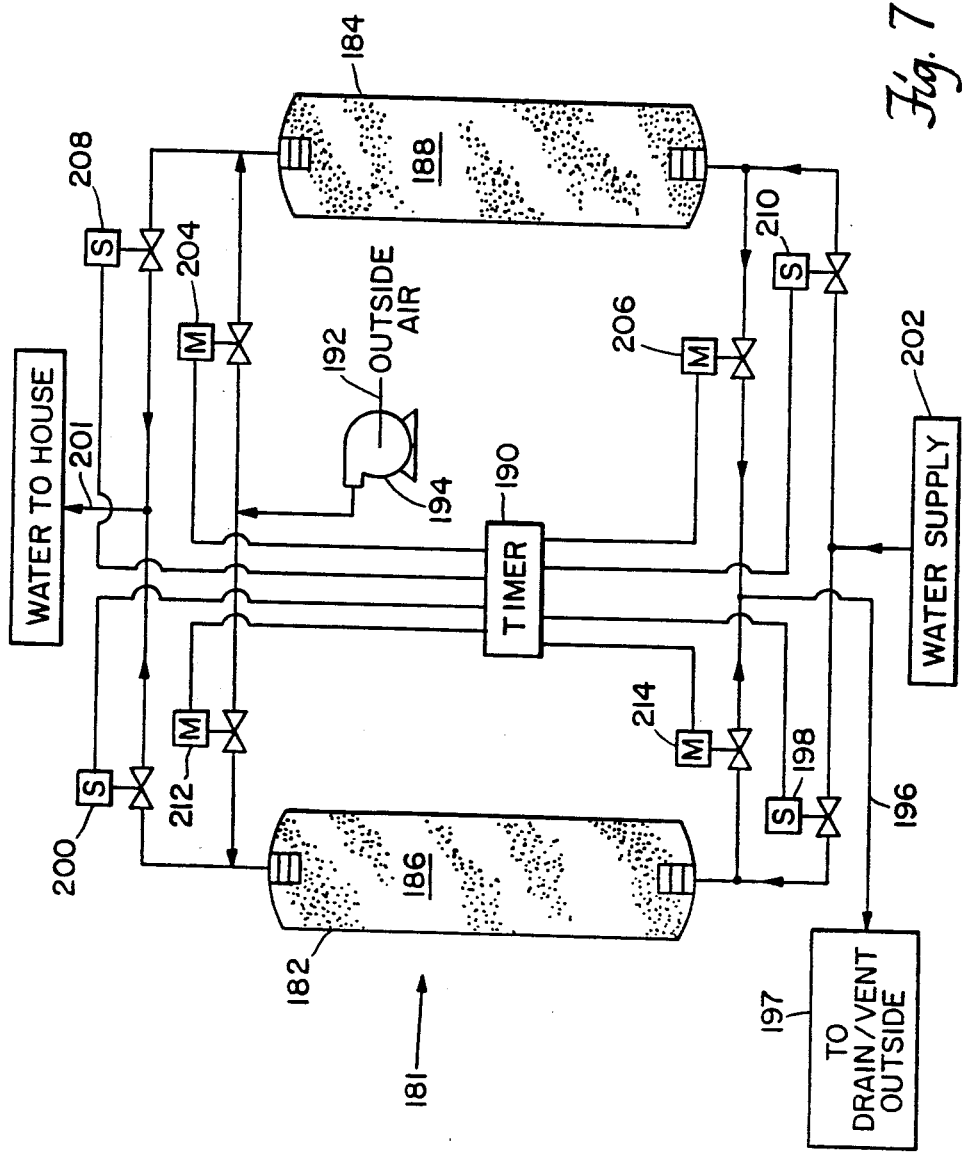
FIG. 7 is a schematic cross-sectional view of still another dynamic adsorber system according to this invention.

In an alternate embodiment, a two-cycle adsorber system 181 includes two dynamic adsorbers 182 and 184 which are alternated so that a continuous, uninterrupted supply of water is available to a house, as illustrated in FIG. 7. Each dynamic adsorber 182, 184 contains an activated charcoal bed 186, 188, respectively, which alternately cleanse water during a first cycle and then are regenerated during the next cycle. Cycles are controlled by a timer 190 which operates a series of solenoids and mechanical valves to open and close air and water pipes to and from the beds.

During one cycle, for example, bed 186 cleanses water while bed 188 is regenerated. Timer 190 enables solenoids 198 and 200, and disables mechanical valves 212 and 214, thereby permitting contaminated water from water supply 202 to flow through bed 186 to a main water supply pipe 201 for supplying cleansed water to a house. During this cycle, timer 190 also enables mechanical valves 204 and 206, and disables solenoids 208 and 210. Outside air, which is supplied by an outside air pipe 192, is fed through bed 188 and then through pipe 196 to a drain and air vent system 197, such as a septic system, by a fan 194. As air flows through bed 188, contaminated water is flushed down the drain, bed 188 is dried, and contaminants, such as radon, are desorbed from the activated charcoal and vented to the outside environment. The duration of this cycle is typically 12 hours, which is a sufficient amount of time to purge radon from bed 188 and to prevent daughter products of radon from forming within bed 188; radon has a half-life of 3.8 days. At the end of this cycle, the state of the solenoids and mechanical valves are reversed so that bed 188 cleanses water and bed 186 is regenerated.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A method of dynamic adsorption for removing a contaminant from a fluid, comprising:

feeding contaminated fluid to be cleansed from a first volume to an adsorption bed having a contaminant removal capacity that is based substantially on the flow of the contaminated fluid through the bed and issuing cleansed fluid from the bed to a second volume; and subsequently regenerating that bed by providing clean fluid, relatively free of the contaminant, from a third volume to the bed to flush it with the clean fluid and returning that fluid to the third volume.

2. The method of dynamic adsorption of claim 1 in which the clean fluid is outside air.

3. The method of dynamic adsorption of claim 1 further including simultaneously regenerating a second adsorption bed while feeding contaminated fluid to the other bed, and subsequently feeding the second bed with contaminated fluid, while regenerating the other bed to provide continuous cleansing of fluid.

4. A method of dynamic adsorption for removing a contaminant from a fluid, comprising:

feeding contaminated fluid to be cleansed from a first volume to an adsorption bed having a capacity for removing the contaminant that is based substantially on the flow of the contaminated fluid through the bed and issuing cleansed fluid to a second volume;

draining the adsorption bed of the contaminated fluid;

drying the adsorption bed; and regenerating the bed by providing clean fluid relatively free of the contaminant from a third volume to the bed to flush it with a clean fluid and thereafter returning the fluid to the third volume.

5. The method of dynamic adsorption of claim 4 in which clean fluid is supplied at a higher flow during the step of regenerating than during the step of feeding contaminated fluid, at least when the temperature of the clean fluid is lower than that of the contaminated fluid.

6. The method of dynamic adsorption of claim 4 in which the first volume includes a contaminated liquid.

7. The method of dynamic adsorption of claim 6 in which the contaminated liquid is water.

8. The method of dynamic adsorption of claim 4 in which regenerating includes supplying gas as the clean fluid from the third volume.

9. The method of dynamic adsorption of claim 8 in which the gas is outside air.

10. The method of dynamic adsorption of claim 8 in which drying includes supplying additional gas to the adsorption bed.

11. A method of dynamic adsorption for removing a contaminant from a fluid, comprising:

feeding contaminated water to be cleansed from a water supply to an adsorption bed having a contaminant removal capacity that is based substantially on the flow of the contaminated water through the bed, and issuing cleansed water from the bed to a second volume; and subsequently regenerating that bed by providing clean fluid, relatively free of the contaminant, from a third volume to the bed to flush it with the clean fluid and returning that fluid to the third volume.

12. A dynamic adsorber system for removing a contaminant from fluid, said system comprising:

an adsorption bed having a contaminant removal capacity that is based substantially on the flow of the contaminated fluid through the bed;

means for feeding contaminated fluid to be cleansed from a first volume to said adsorption bed and for issuing cleansed fluid to a second volume;

means for providing clean fluid, relatively free of the contaminant, from a third volume to said bed to flush it with clean fluid and for issuing the fluid back to the third volume, said means for providing supplying the clean fluid at a greater flow than that of the contaminated fluid to the bed, at least when the temperature of the clean fluid is lower than that of the contaminated fluid; and control means for alternating said means for feeding and means for providing to cleanse said contaminated fluid and to regenerate said adsorption bed.

13. The dynamic adsorber system of claim 12 in which said means for feeding obtains contaminated liquid from the first volume.

14. The dynamic adsorber system of claim 12 in which the first volume includes a water supply and said means for feeding obtains water from the water supply as the contaminated fluid.

15. The dynamic adsorber system of claim 12 in which said control means further include timer means for establishing successive time periods that determine when the bed is to be alternately connected to either said means for feeding or said means for providing to accomplish cleansing with or regeneration of the bed, respectively.

16. The dynamic adsorber system of claim 12 in which said means for feeding includes feed fan means for driving the clean fluid through said adsorption bed.

17. The dynamic adsorber system of claim 12 in which said adsorption bed includes activated charcoal.

18. A dynamic adsorber system for removing a contaminant from fluid, comprising:

first and second adsorption beds, each bed having a contaminate removal capacity that is based substantially on the flow of the contaminated fluid through each bed;

means for feeding contaminated fluid to be cleansed from a first volume to one of said beds and for issuing cleansed fluid to a second volume;

means for providing clean fluid relatively free of the contaminant from a third volume to the other of said beds to flush it with the clean fluid and for issuing the fluid to the third volume, said means for providing supplying the clean fluid at a greater flow than that of the contaminated fluid fed to that bed, at least when the temperature of the clean fluid is lower than that of the contaminated fluid; and control means for connecting said means for feeding alternately to said first and second beds to remove the contaminant from the fluid, and for connecting said means for providing to the bed not connected to said means for feeding to regenerate that bed before it is reconnected to said means for feeding.

19. The dynamic adsorber system of claim 18 in which said means for providing obtains outdoor air as the clean fluid and returns the issued contaminated fluid outdoors.

20. The dynamic adsorber system of claim 18 in which said control means includes timer means for establishing successive time periods to determine when each bed is to be alternately connected to one of said means for feeding or said means for providing to accomplish cleansing with or regeneration of that bed, respectively.

21. A dynamic adsorber system for removing a contaminant from water, comprising:

first and second adsorption beds, each having a capacity for removing the contaminant that is based substantially on the flow of the contaminated water through the bed;

means for feeding contaminated water from a water supply to be cleansed to one of said beds and for issuing cleansed water to a water dispenser;

means for providing outdoor air relatively free of the contaminant to the other of said beds to remove the contaminant and for issuing the contaminant to the outdoors, said means for providing supplying the outdoor air at a greater flow than that of the contaminated water, at least when the temperature of the air is lower than that of the contaminated water; and control means for connecting said means for feeding alternately to said first and second beds to remove the contaminant from the water and for connecting said means for providing to the bed not connected to said means for feeding to regenerate that bed before it is reconnected to said means for feeding.

22. A dynamic adsorber system for removing a contaminant from fluid, said system comprising:

an adsorption bed having a contaminant removal capacity that is based substantially on the flow of the contaminated fluid through the bed;

means for feeding contaminated fluid to be cleansed from a first volume to said adsorption bed and for issuing cleansed fluid to a second volume;

means for providing clean fluid, relatively free of the contaminant, from a third volume to said bed to flush it with clean fluid and for issuing the fluid back to the third volume, said means for providing obtaining gas from the third volume as the clean fluid; and control means for alternating said means for feeding and means for providing to cleanse said contaminated fluid and to regenerate said adsorption bed.

23. The dynamic adsorber system of claim 22 in which the third volume includes outdoor air and said means for providing obtains outdoor air as the clean fluid and returns the issued contaminated fluid back to the outdoor air.

24. A dynamic adsorber system for removing a contaminant from fluid, comprising:

first and second adsorption beds, each bed having a contaminate removal capacity that is based substantially on the flow of the contaminated fluid through each bed;

means for feeding contaminated fluid to be cleansed from a first volume to one of said beds and for issuing cleansed fluid to a second volume, said means for feeding obtaining water from a water supply as the contaminated fluid;

means for providing clean fluid relatively free of the contaminant from a third volume to the other of said beds to flush it with the clean fluid and for issuing the fluid to the third volume, said means for providing supplying the clean fluid at a greater flow than that of the contaminated fluid fed to that bed, at least when the temperature of the clean fluid is lower than that of the contaminated fluid; and control means for connecting said means for feeding alternately to said first and second beds to remove the contaminant from the fluid, and for connecting said means for providing to the bed not connected to said means for feeding to regenerate that bed before it is reconnected to said means for feeding.

25. A dynamic adsorber system for removing a contaminant from water, comprising:

first and second adsorption beds, each having a capacity for removing the contaminant that is based substantially on the flow of the contaminated water through the bed;

means for feeding contaminated water from a water supply to be cleansed to one of said beds and for issuing cleansed water;

means for providing air relatively free of the contaminant to the other of said beds to remove the contaminant and for issuing the contaminant to the outdoors, said means for providing supplying the outdoor air at a greater flow than that of the contaminated water, at least when the temperature of the air is lower than that of the contaminated water; and control means for connecting said means for feeding alternately to said first and second beds to remove the contaminant from the water and for connecting said means for providing to the bed not connected to said means for feeding to regenerate that bed before it is reconnected to said means for feeding.

26. A dynamic adsorber system for removing a contaminant from a liquid, said system comprising:

an adsorption bed having a contaminant removal capacity that is based substantially on the flow of the contaminated liquid through the bed;

means for feeding contaminated liquid to be cleansed from a first volume to said adsorption bed and for issuing cleansed liquid to a second volume;

means for providing clean fluid, relatively free of the contaminant and form a source separate from the contaminated and cleansed fluid, to said bed to flush it with clean fluid and for issuing the fluid to a volume separate from the first and second volume, said means for providing supplying the clean fluid at greater flow than that of the contaminated fluid to the bed, at least when the temperature of the clean fluid is lower than that of the contaminated fluid; and control means for alternating said means for feeding and means for providing to cleanse said contaminated fluid and to regenerate said adsorption bed.

* * * * *